United States Patent
Trutna, Jr.

(10) Patent No.: US 7,656,428 B2
(45) Date of Patent: Feb. 2, 2010

(54) IMAGING DEVICE EMPLOYING OPTICAL MOTION SENSOR AS GYROSCOPE

(75) Inventor: William R. Trutna, Jr., Atherton, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 883 days.

(21) Appl. No.: 11/122,964

(22) Filed: May 5, 2005

(65) Prior Publication Data
US 2006/0251410 A1 Nov. 9, 2006

(51) Int. Cl.
*H04N 5/228* (2006.01)
*H04N 5/262* (2006.01)

(52) U.S. Cl. ............... 348/208.1; 348/208.4; 348/208.7; 348/240.3

(58) Field of Classification Search ............... 348/208.1, 348/208.4, 208.7, 208.11, 240.3, 335, 294
See application file for complete search history.

(56) References Cited

U.S. PATENT DOCUMENTS

| | | | |
|---|---|---|---|
| 3,650,596 | A | 3/1972 | Thevenaz |
| 4,615,590 | A | 10/1986 | Alvarez et al. |
| 4,862,277 | A | 8/1989 | Iwaibana |
| 5,534,967 | A | 7/1996 | Matsuzawa |
| 5,619,030 | A | 4/1997 | Shiomi |
| 5,644,139 | A | 7/1997 | Allen et al. |
| 5,729,008 | A | 3/1998 | Blalock et al. |
| 5,774,266 | A | 6/1998 | Otani et al. |
| 5,786,804 | A | 7/1998 | Gordon |
| 5,809,346 | A | 9/1998 | Fujisaki |
| 5,903,307 | A * | 5/1999 | Hwang .................... 348/208.1 |
| 5,978,600 | A | 11/1999 | Takeuchi et al. |
| 6,035,133 | A | 3/2000 | Shiomi |
| 6,137,535 | A * | 10/2000 | Meyers .................... 250/208.1 |
| 6,630,951 | B1 * | 10/2003 | Suzuki .................... 348/208.1 |
| 6,751,410 | B1 | 6/2004 | Stavely |
| 7,154,136 | B2 * | 12/2006 | Cole et al. ................. 257/292 |
| 2005/0047672 | A1 * | 3/2005 | Ben-Ezra et al. ............ 382/255 |

FOREIGN PATENT DOCUMENTS

| | | |
|---|---|---|
| EP | 0682449 | 11/1997 |
| GB | 2273223 | 6/1994 |

* cited by examiner

*Primary Examiner*—Nhan T Tran

(57) ABSTRACT

A motion sensor configured to control compensation for movement of an imaging device receiving light representative of a selected scene on an image plane. The motion sensor includes and array of photoelements and a controller. The array of photoelements is configured to acquire successive images of features of an environment within a field of view of the motion sensor; including a first image of features and a second image of features acquired at a time interval after the first image, the first and second images including common features. The controller is configured to receive and correlate the first and second images to detect movement of the imaging device about a first and a second axis during the time interval by detecting differences in locations of the common features relative to the array of photoelements, and to provide first and second compensation signals based on the correlation to control opto-mechanical adjustments to counter detected movement of the imaging device about the first and second axes so as to maintain a substantially fixed relationship between the selected scene and the imaging plane.

16 Claims, 12 Drawing Sheets

IMAGING DEVICE EMPLOYING OPTICAL MOTION SENSOR AS GYROSCOPE

BACKGROUND

Image blur is a common problem in photography and has a variety of causes such as motion of the subject and focusing errors. However, one of the most common causes of image blur is camera shake by the operator. Human muscles naturally tremor at frequencies generally in the range of 4-12 Hertz. When a person is holding a camera, this tremor causes blur in the image. Blur caused by such human tremor is particularly noticeable with long exposure times or when using a zoom/telephoto lens capable of very long focal lengths. In efforts to reduce such blur, hand-held imaging systems such as digital cameras, camcorders, and binoculars often employ some type of image stabilization system.

Several methods and systems for image stabilization have been developed. However, regardless of the system and/or method, all rely on a motion sensor to detect motion and a means to compensate for the detected motion. With still cameras, the motion sensor is generally a piezoelectric gyroscope or a MEMs (micro-electro-mechanical) gyroscope. Such gyroscopes generally come in small PC board mountable packages and are generally quite costly relative to the price of the imaging device. Since two gyroscopes are required for image stabilization, the cost of such gyroscopes is generally prohibitive for use in low-priced, high volume imaging devices. Camcorders often employ an electronic method wherein motion is detected by comparing each frame of a scene to the previous frame. While such a technique is viable, it requires a large amount of signal processing and can be confused by objects which are moving within the scene.

Image stabilization systems generally compensate for detected motion either electronically or optically. In camcorders, electronic compensation is achieved by using an oversized image sensor. Only a portion of the image sensor employed at any one time to record the image, and the portion of the image senor recording the image is shifted around the image sensor over time under the control of a gyroscope as the camera moves. The pixel data from the image sensor is then cropped accordingly for each frame for recording.

Both still cameras and camcorders employ opto-mechanical methods for shifting the image to compensate for detected motion. One such method employs a gyroscope and a moveable lens element. Generally, camera rotation causes an image translation relative to the image sensor. Motion detected by the gyroscope is converted to a control signal that is employed by a motor to move the lens element in a translation that moves the image equal and opposite to the translation caused by the detected motion.

Another opto-mechanical method employs a gyroscope and a variable prism. The variable prism comprises a pair of flat glass plates connected by a bellows which forms a liquid-tight seal. The chamber between the glass plates is filled with a liquid with the same refractive index as the glass plates. Motion detected by the gyroscope is converted to a control signal with is employed by a motor to adjust the bellows and control the angle between the glass plates to "steer" the image so as to counteract the translation caused by the detected motion.

While viable at compensating for image translation, each of the above described opto-mechanical methods for image translation are open-loop systems, meaning that there is no feedback control of the image position and, thus, no way of verifying/ensuring that the image has been properly translated. Additionally, as mentioned earlier, each of these methods employs relatively costly gyroscopes as motion sensors.

SUMMARY

In one aspect, the present invention provides a motion sensor configured to control compensation for movement of an imaging device receiving light representative of a selected scene on an image plane. The motion sensor includes and array of photoelements and a controller. The array of photoelements is configured to acquire successive images of features of an environment within a field of view of the motion sensor; including a first image of features and a second image of features acquired at a time interval after the first image, the first and second images including common features. The controller is configured to receive and correlate the first and second images to detect movement of the imaging device about a first and a second axis during the time interval by detecting differences in locations of the common features relative to the array of photoelements, and to provide first and second compensation signals based on the correlation to control opto-mechanical adjustments to counter detected movement of the imaging device about the first and second axes so as to maintain a substantially fixed relationship between the selected scene and the imaging plane.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
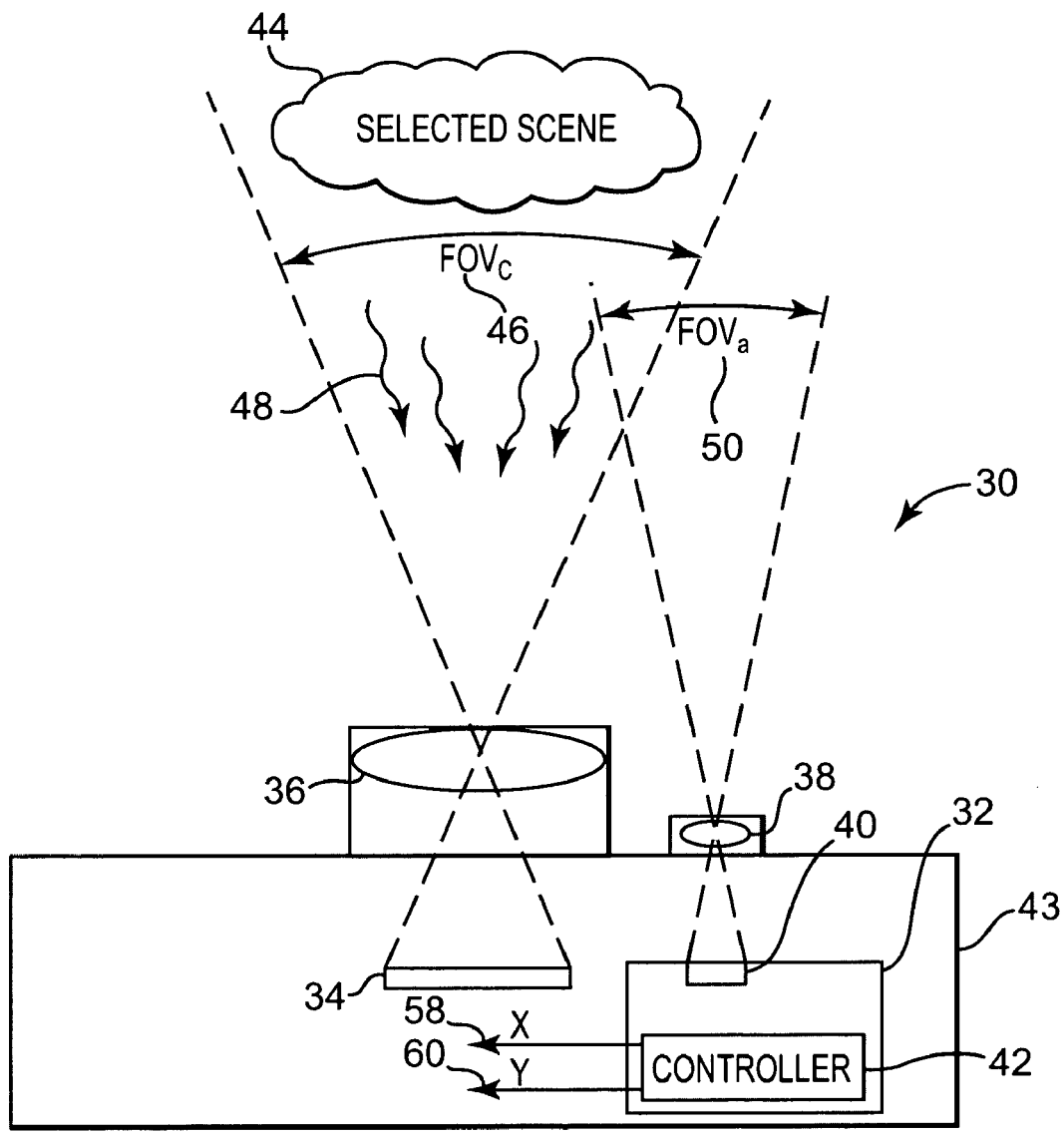
FIG. 1 is a block diagram illustrating generally one embodiment of a camera employing a motion sensor configured as a digital gyroscope in accordance with the present invention.

FIG. 1 is a block diagram illustrating generally one embodiment of an imaging device, such as camera 30, employing a motion sensor 32 configured as a digital gyroscope to control compensation for movement of camera 30 according to the present invention. Camera 30 includes an image plane 34, a camera objective lens 36, and a gyroscope objective lens 38. In one embodiment, camera 30 comprises an analog camera with image plane 34 comprising photosensitive imaging film. In one embodiment, camera 30 is a digital camera with image plane 34 comprising a camera image sensor comprising an array of photoelements or pixels such as, for example, CCD (charge-coupled device) type pixels and CMOS (complimentary metal-oxide semiconductor) type pixels.

Digital gyroscope 32 further includes an array of photoelements, or pixels, configured as a gyroscope image sensor 40 and a controller 42. In one embodiment, gyroscope image sensor 40 comprises 30×30 array of CMOS pixels. In one embodiment, digital gyroscope 32 comprises an integrated circuit package including gyroscope image sensor 40 and controller 42. Digital gyroscope 32, image plane 34, and camera and gyroscope objective lenses 36, 38 are positioned within a camera body or housing 43.

When camera 30 is pointed at a selected scene 44 within a field of view 46 (FOV$_C$) of camera objective lens 34, camera objective lens is positioned to receive and project light 48 representative of selected scene 44 on image plane 34. Similarly, gyroscope objective lens 38 is configured to receive and project light from an environment within a field of view 50 (FOV$_G$) on gyroscope image sensor 40. In one embodiment, gyroscope objective lens 138 is focused at infinity.

Figure 2:
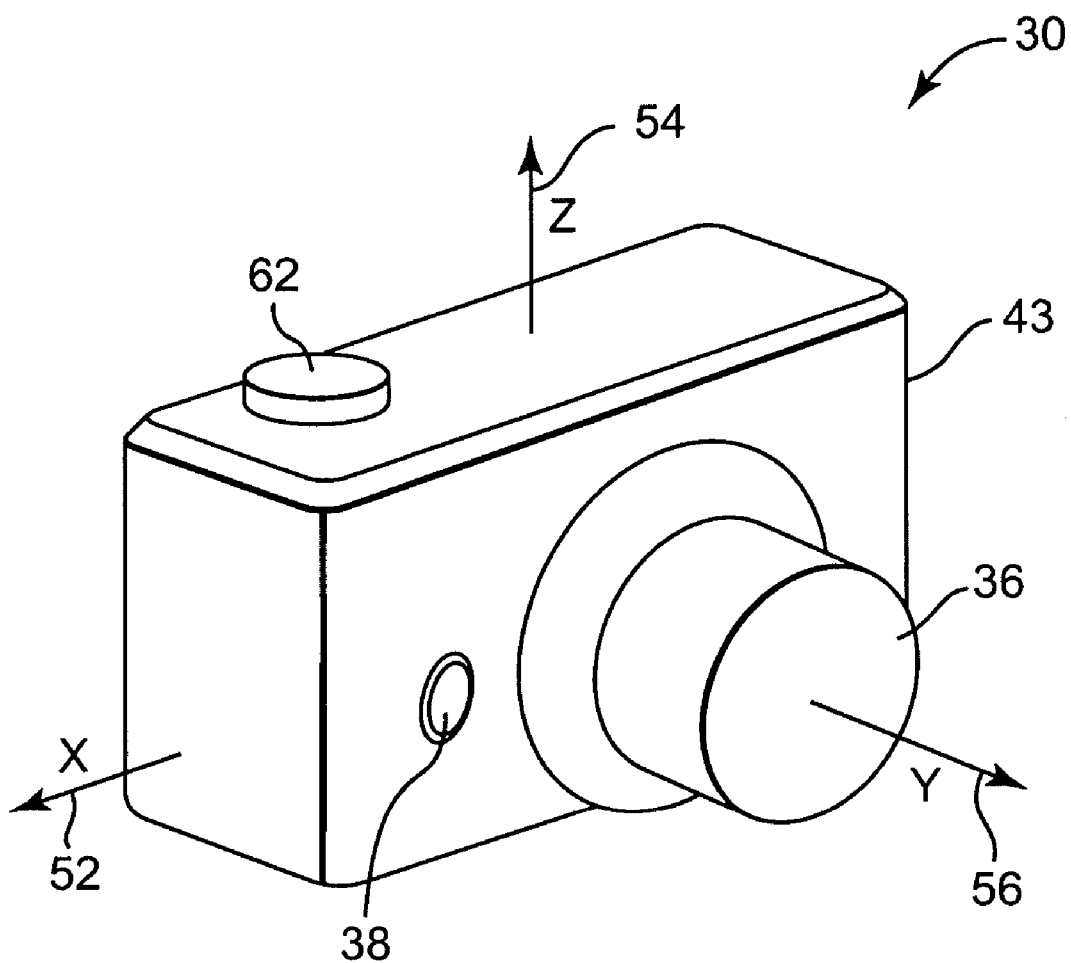
FIG. 2 is a simplified isometric view of the camera of FIG. 1.

FIG. 2 is a simplified isometric view of camera 30 of FIG. 1. When a photographer holds a camera by hand, it is common for natural, involuntary hand movements, or tremors, to impart motion to the camera. Camera movement about the x- and z-axes, 52 and 54, introduces blur into photographs taken with camera 30. The extent of the blur introduced depends on the speed of the movement, the exposure time of the photograph, and the magnification setting of the camera, usually indicated by a focal length of camera objective lens 36.

In 35-millimeter photography, a commonly cited rule of thumb states that the longest exposure time (in seconds) for which a camera can be reliably hand held is the reciprocal of the focal length of the lens (in millimeters). For example, when using a 50-millimeter lens, a camera could be hand held for exposure times of $\frac{1}{50}$ of a second or faster. Similarly, when using a 300-millimeter lens, an exposure time of $\frac{1}{300}$ second or less is typically necessary for taking a sharp photograph without the aid of a tripod.

The motion imparted to camera 30 by involuntary hand motions is typically oscillatory, and consists of vibrations within a frequency range of about 4 to 12 Hertz. The involuntary hand motion may be about all six degrees of freedom. However, image blurring, translation of the received light 48 on imaging plane 34, is caused primarily by rotations about the x-axis and the z-axes 52, 54. Rotation about x-axis 52 causes translation of the received light 48 along z-axis 54, and rotation about z-axis 54 causes translation of the received light along x-axis 52. Motion about y-axis 56 typically has a negligible effect on image sharpness because such motion is generally not pronounced and because photographs are often taken at magnification ratios that minimize the effect of motion along y-axis 56.

Returning to FIG. 1, the gyroscope image sensor 40 is configured to acquire successive images of features of the environment within FOV$_G$ 50 of digital gyroscope 32. The successive images include a first image of features and second image of features acquired at a time interval after the first image, with the first and second images including common features. Such features can be any object or element within the environment such as, for example, a tree, a building structure, a chair, or a table. It should be noted that the features may or may not be located within FOV$_C$ 46 of image plane 34.

In one embodiment, gyroscope image sensor 40 begins acquiring successive image when a shutter control button 62 (see FIG. 2) is partially or fully depressed by a user. In one embodiment, gyroscope image sensor 140 is configured to acquire up to 1,000 images of features of the environment per second.

Controller 42 is configured to receive the acquired images from gyroscope image sensor 40 and to correlate the first and second images to detect movement of camera 30 about x-axis 52 and z-axis 54 during the time interval by detecting differences in locations of the common features relative to the array of pixels of gyroscope image sensor 40. In one embodiment, the first image is referred to as a reference image. In one embodiment, reference image is the initial image acquired by array 40 after shutter control button 62 is depressed. In one embodiment, controller 42 correlates the reference image with each successively acquired image received from gyroscope image sensor to detect motion of camera 30. One embodiment of digital gyroscope 32 and an example correlation process employed by digital gyroscope 32 are described in greater detail below by FIGS. 8 through 15.

Based on the correlation, controller 42 provides first and second compensation signals, 58 and 60, to control optomechanical adjustments to counter detected movement of cameral 30 about x- and z-axes 52, 54 so as to maintain a substantially fixed relationship between selected scene 44 and imaging plane 34. In one embodiment, first compensation signal 58 controls adjustments along x-axis 52 and second compensation signal 60 controls adjustment along z-axis 54.

As employed herein, "opto-mechanical adjustment" comprises control of moveable lens elements (see FIG. 4 below) and/or movement of the image plane (see FIGS. 3A and 3B below) to maintain a substantially fixed relationship between selected scene 44 and imaging plane 34. It does not include making adjustments to a position of the camera housing 43 to stabilize the image.

In summary, by employing an array of photoelements to detect motion, such as a CMOS-based image sensor, digital gyroscope 32 according to the present invention provides a cost effective alternative to costly, mechanical based gyroscopes. As a result, digital gyroscope 32 provides a cost-effective means of image stabilization for low-priced, high volume imaging devices. Additionally, as will be described in greater detail below with respect to FIGS. 3A and 3B, digital gyroscope 32 provides image stabilization systems with a means for direct feedback control of the image position, thereby improving image stabilization system performance.

Figure 3A:
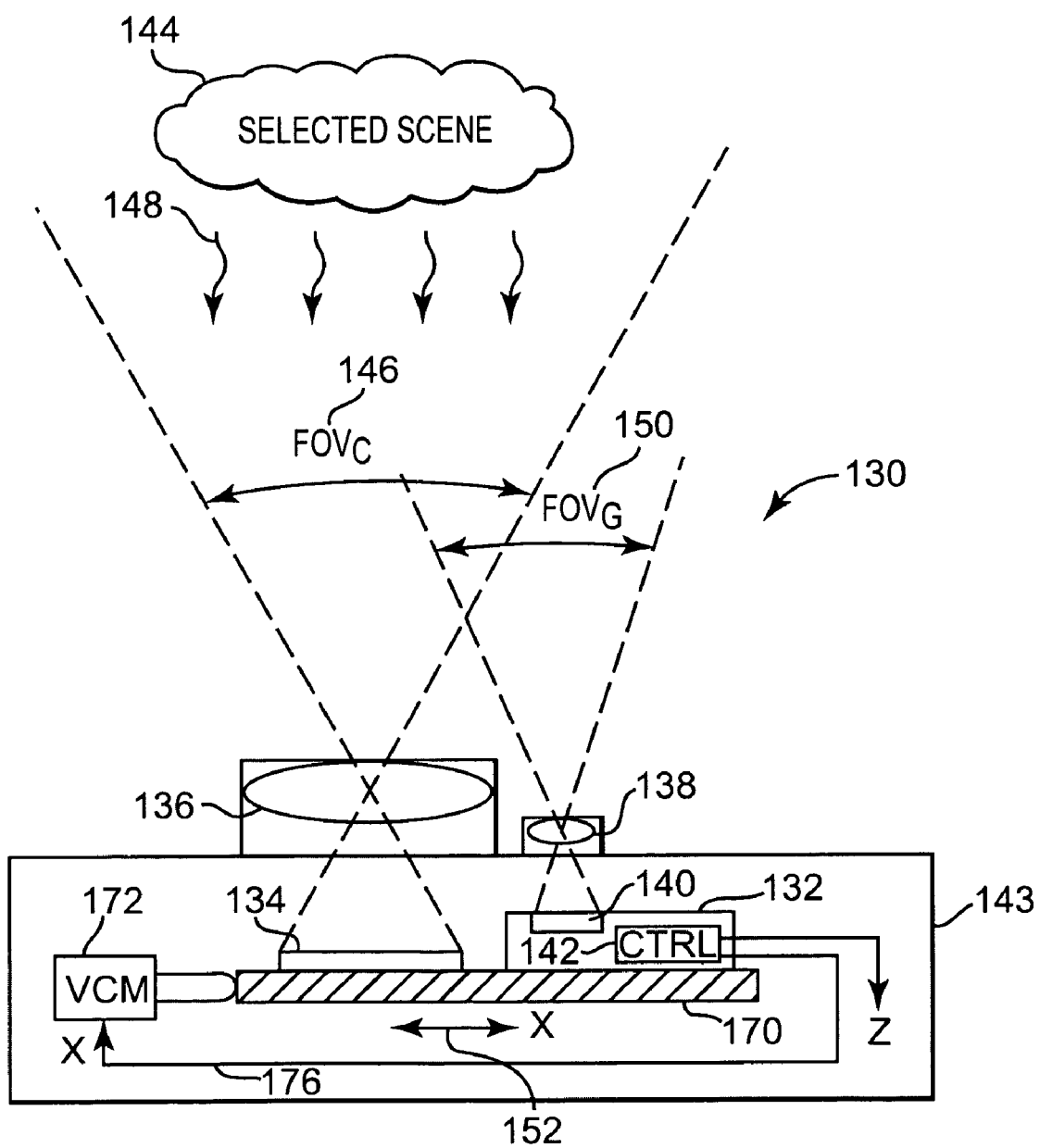
FIG. 3A is a block and schematic diagram of a camera employing an image stabilization system according to the present invention.
Figure 3B:
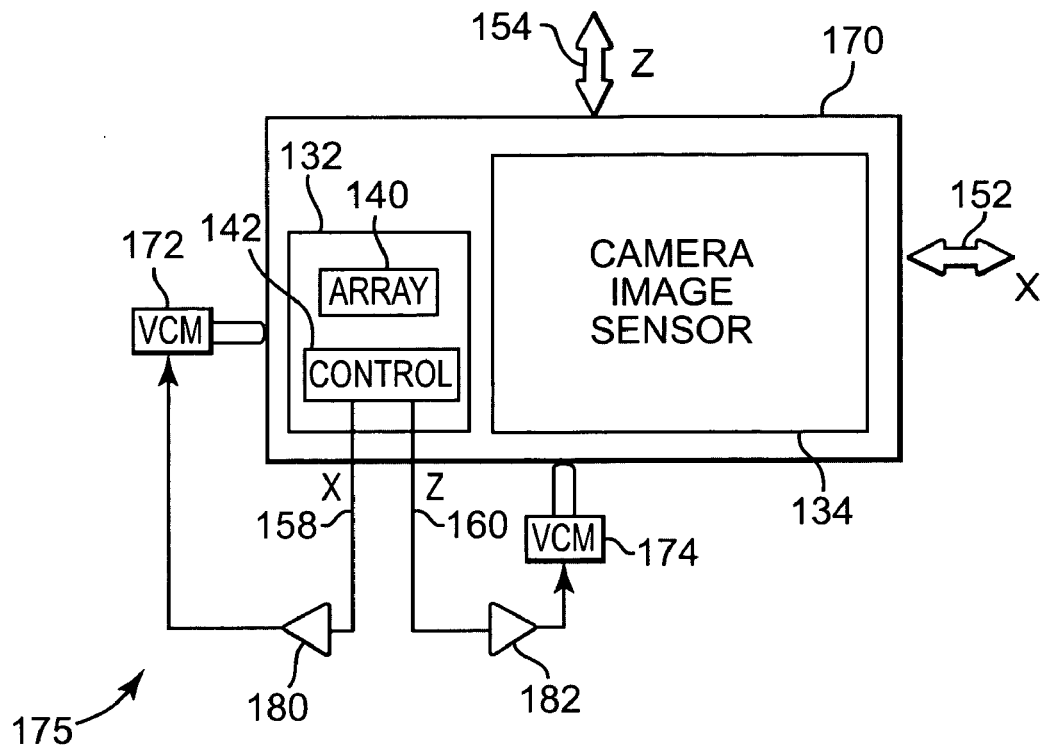
FIG. 3B is a block and schematic diagram illustrating the image stabilization of FIG. 3A.

FIGS. 3A and 3B are block and schematic diagrams illustrating generally one embodiment of a digital camera 130 employing one embodiment of an image stabilization system according to the present invention. Camera 132 includes a digital gyroscope 132, a camera image sensor 134, a camera objective lens 136, and a gyroscope objective lens 138. Digital gyroscope 132 further includes a gyroscope image sensor 140 and a controller 142.

In one embodiment, as illustrated, digital gyroscope 132 and camera image sensor 134 are mounted to a moveable translation stage 170. Translation stage 170 is moveable along x-axis 152 by a first voice coil motor (VCM) 172. Translation table 170 is moveable along z-axis 154 by a second VCM 174 (see FIG. 3B). Together, digital gyroscope 132, translation stage 170, and VCMs 172, 174 form a closed-loop image stabilization system 175 for stabilizing images received by camera image sensor 134 via cameral objective lens 136. In one embodiment (not illustrated), gyroscope image sensor 140 is mounted to translation stage 170 and controller 142 is positioned at a location separate from translation stage 170.

With reference to FIGS. 3A and 3B, when camera 130 is focused on a selected scene 144 with $FOV_C$ 146, camera objective lens 136 projects light 148 from selected scene 144 on camera image sensor 134. Similarly, gyroscope objective lens 138 receives and projects light from the environment with $FOV_G$ 150 on gyroscope image sensor 140. In one embodiment, gyroscope image sensor 140 comprises CMOS image sensor having a 30×30 array of pixels. In one embodiment, gyroscope image sensor 140 comprises a 16×16 array of pixels.

Gyroscope image sensor 140 is configured to acquire successive images of features of the environment within $FOV_G$ 150. The successive images include a first image of features and a second image of features, with the second image of features acquired at a time interval after the first image, with the first and second images including common features. In one embodiment, gyroscope image sensor 140 is configured to acquire up to 1,000 images of features of the environment per second. In one embodiment, as mentioned above, the gyroscope image sensor 140 begins acquiring successive image when a shutter control button 62 (see FIG. 2) is partially or fully depressed by a user.

Controller 142 receives the successive images from gyroscope image sensor 140. Rotation of camera 130 about the x- and z-axes 152, 154 selected scene 144 and the features in FOVG 150 to be respectively translated across camera image sensor 134 and gyroscope image sensor 140 from one image to the next. To detect such motion of camera 130, controller 142 correlates the first and second images to detect differences in the pixel locations of the common features on gyroscope image sensor 140 between the first and second images.

Based on the correlation, controller 142 provides a first compensation signal 158 to first VCM 172 to counter detected movement along x-axis 152, and a second compensation signal 160 to second VCM 174 to counter detected movement along z-axis 154. As an example, movement of camera 130 down and to the left by a second amount (relative to a user) respectively causes translation of selected scene 144 and features of the environment within $FOV_G$ 150 up by a first amount and to the right by a second amount with respect to camera image sensor 134 and gyroscope image sensor 140. Via the correlation process, controller 142 detects such movement and, in response, provides first compensation signal 158 that causes first VCM 172 to move translation stage 170 to move to the right by the second amount along x-axis 152, and second compensation signal 160 that causes second VCM 174 to move translation stage 170 up by the first amount along y-axis 154. In one embodiment, as illustrated, amplifiers 180, 182 are included in the signal paths for first and second compensation signals 158, 160 to provide required signal values to VCMs 172, 174.

By moving translation stage 170 to counter motion of camera 130, stabilization system 175 maintains a substantially fixed relationship between the features of the environment within $FOV_G$ 150 and gyroscope image sensor 140. Since camera image sensor 134 is mounted to translation stage 170, counteracting the motion of the features of the environment with FOVG 150 automatically counteracts the motion of selected scene 144 relative to camera image sensor 134, thereby stabilizing the image of selected scene 144 received by image sensor 134 and reducing blur in the resulting photographic image. Furthermore, by moving gyroscope image sensor 140 in concert with camera image sensor 134 on translation stage 170, stabilization system 175 provides direct feedback control of the image position (i.e. selected scene 144), thereby improving system performance.

Figure 4:
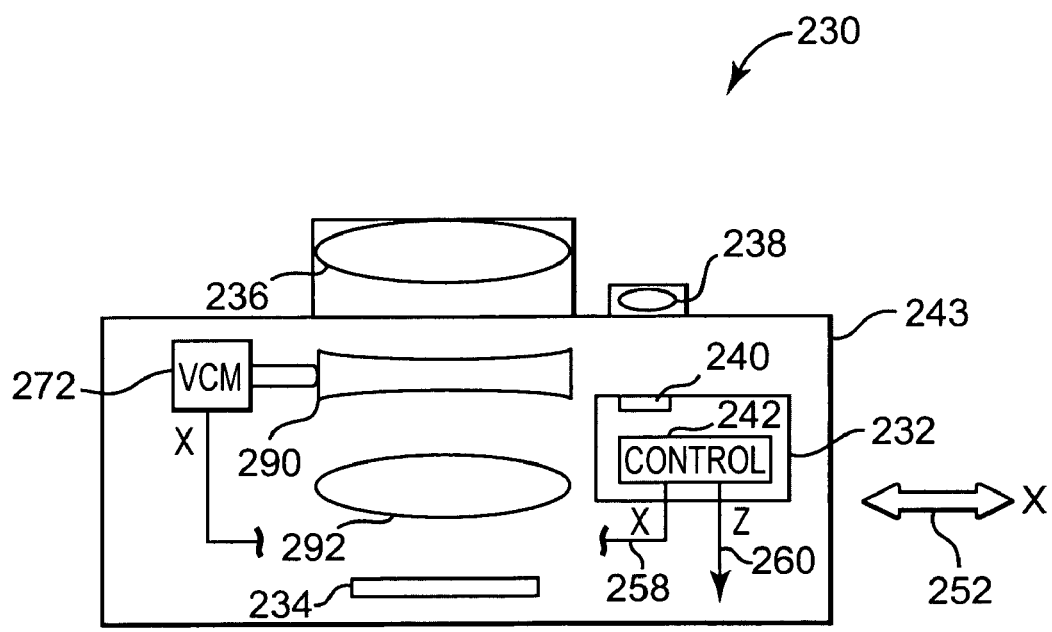
FIG. 4 is a block and schematic diagram of a camera employing an image stabilization system according to the present invention.

FIG. 4 is a block and schematic diagram illustrating one embodiment of a camera 230 employing another embodiment of an image stabilization system according to the present invention. Camera 230 employs digital gyroscope 232, an image plane 234, a camera objective lens 236, and a gyroscope objective lens 238. Digital gyroscope further includes a gyroscope image sensor 240 comprising an array of pixels elements and a controller 242. In one embodiment, image plane 234 comprises photosensitive imaging film. In one embodiment, image plane 234 comprises an image sensor.

Camera 230 further includes a pair of compensation lenses including a moveable concave lens element 290 and a fixed-mounted concave lens element 292. A first VCM 272 moves concave lens element 290 along x-axis 252 in response to first compensation signal 258, and a second VCM (not illustrated) moves concave lens element 290 along the z-axis in response to second compensation signal 260. Together, digital gyroscope 232, the first and second VCMs, moveable concave lens element 290, and fixed-mounted convex lens element 292 form an open loop image stabilization system 275.

In a fashion similar to that described above with respect to digital gyroscope 132 of FIGS. 3A and 3B, digital gyroscope 232 detects rotation of camera 230 about the x- and z-axes by correlating first and second images of features of an environment within a field of view of gyroscope objective lens 238. Based on the correlation, digital gyroscope provides first and second compensation signals which cause the first and second voice coil motors to move lens element 290 an appropriate distance along the x- and z-axes to counter the detected movement of camera 230. Camera image sensor 234 and digital gyroscope 232 remain stationary. By controlling the movement of concave lens element 290 to counter the movement of camera 230, concave lens element 290 and fixed-mounted convex lens element 292 work together to translate the light received via camera objective 236 relative to image plane 234 such that the image ream remains substantially stationary relative to image plane 234.

The relationship between gyroscope image sensor 240 and the light representative of the features of the environment within the field of view of and received via gyroscope objective lens 238 is not similarly adjusted. As such, stabilization system 275 is an open-loop system as it does not receive direct feedback of the image position (e.g. selected scene 144 of FIG. 3A).

Figure 5:
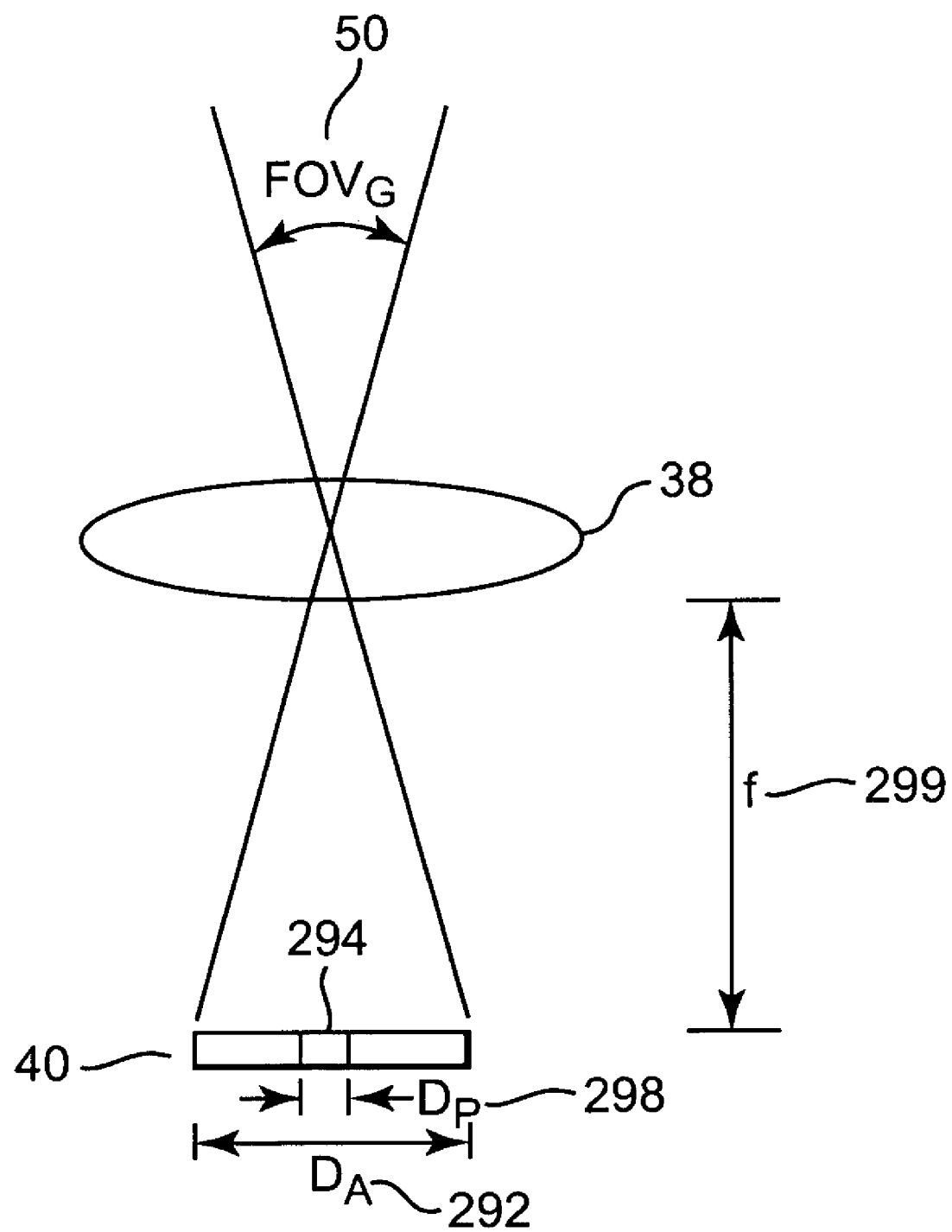
FIG. 5 is a schematic diagram illustrating generally the relationship between an image sensor and a corresponding objective lens.

FIG. 5 is a schematic diagram illustrating the relationship between an image sensor and a corresponding objective lens, such as gyroscope objective lens 38 and gyroscope image sensor 40 of digital gyroscope 32 as illustrated by FIG. 1. Gyroscope image sensor 40 comprises an array of pixels having a width $d_A$, as indicated at 292, with each individual pixel, such as pixel 294 having a substantially same width $d_P$ as indicated at 298. The field of view ($FOV_G$) 50 of gyroscope objective lens 38, in radians, is equal to the ratio of the width $d_A$ 292 of gyroscope image sensor 40 to the focal length (f) 299 of lens 38.

In order for digital gyroscope 32 to detect motion, gyroscope image sensor 40, and thus $FOV_G$ 50, must be turned by at least a certain minimum angle. When camera 30 is a digital camera, an image acquired by camera image sensor 34 will begin to noticeably blur when camera 30 is turned by a certain minimum angle that causes a one pixel shift in the position of the received image on image sensor 34. These certain minimum angles are referred to as the angular resolutions of gyroscope image sensor 40 and camera image sensor 34.

If the angular resolution of gyroscope image sensor 40 is greater than the angular resolution of camera image sensor 34, digital gyroscope 32 will not be able to detect motion of camera 30 before the image acquired by camera image sensor 34 begins to blur. In such an instance, digital gyroscope 32 will not adequately counteract for the movement of camera 30 and thus, will not adequately stabilize the image received by camera image sensor 34. In light of the above, the angular resolution of digital gyroscope 32 should not exceed the angular resolution of camera image sensor 34, and it is desirable that the angular resolution of gyroscope image sensor 40 substantially match the angular resolution of camera image sensor 34.

The angular resolution of gyroscope image sensor 40 is based on the focal length of gyroscope lens 38 and the minimum detectable image motion of gyroscope image sensor 40. The minimum detectable image motion is, in-turn, related to the size of the pixels employed by gyroscope image sensor 40. Pixel size influences image quality, wherein generally, the bigger the pixel size, the better the image quality. In one example embodiment, array 38 comprises a 30×30 array of 60 micron pixel having a minimum detectable image motion approximately equal to $\frac{1}{16}^{th}$ of a pixel. Dividing 60 microns by 16 equates to a minimum detectable image motion of 3.75 microns. If gyroscope lens 38 has a focal length of 10 millimeters, the minimum detectable motion of 3.75 microns equates an angular resolution of 0.375 milliradians. Converting to degrees equates to an angular resolution of approximately 0.0215 degrees.

The angular resolution of camera image sensor 34 is based on the size of the pixels and the focal length of camera objective lens 36. As an example, one low-end digital camera includes a lens having a focal length of 5.7 millimeters and employs a 3 megapixel image sensor, wherein the pixel size is approximately 2.6 microns (pixel size varies between cameras). Diving 2.6 microns by 5.7 millimeters equates to an angular resolution of approximately 0.46 milliradians. Converting to degrees equates to an angular resolution of approximately 0.026 degrees. This is a good match with the above-described digital gyroscope having an angular resolution of 0.0215 degrees.

Based on the above, to match the angular resolution of gyroscope 32 to the angular resolution of camera image sensor 34, the minimum detectable motion of gyroscope image sensor 40 can be adjusted and/or the focal length of gyroscope objective lens. However, it is generally much simpler to select a gyroscope objective lens 38 having a focal length 299 that results to match the angular resolution of gyroscope image sensor 40 with that of camera image sensor 34 than it is to adjust the minimum detectable motion of gyroscope image sensor 40. As such, gyroscope objective lens 38 can be chosen on a camera-by-camera basis so as to best match the angular resolution of digital gyroscope 32 with camera image sensor 34. In one embodiment, when camera objective lens 36 comprises a zoom lens having a variable focal length, the angular resolution of digital gyroscope is configured to substantially match the angular resolution of camera image sensor 34 when zoom lens 36 is in a telephoto position (i.e. "zoomed-in"). Zoom lens 36 has the longest focal length in the telephoto position as opposed to being in a wide angle position.

In addition to angular resolution, another factor to consider when configuring an image stabilization system employing a digital gyroscope is the field of view of the gyroscope image sensor, such as $FOV_G$ 50 of digital gyroscope image sensor 40 as illustrated by FIG. 1. As described above with reference to FIG. 3, the field of view (in radians) of an image sensor is defined as the ratio of the width of the image sensor to the focal length of the corresponding objective lens (e.g. the ratio of dA 292 to f 299)

Referring to the above example employed to describe angular resolution, the 30×30 array of 60 micron pixels of the gyroscope image sensor has a field of view of about 10 degrees (e.g. $FOV_G$ 50 of FIG. 1), while the 3 megapixel camera image sensor has a field of about 50 degrees (e.g. $FOV_C$ 46 of FIG. 1). As such, the field of view of the gyroscope image sensor is only ⅕ as wide as the field of view of the camera image sensor. As a result, there is a chance that the portion of the image viewed by the gyroscope image sensor may not contain a high contrast feature which the digital gyroscope can use a reference to detect motion.

In light of the above, it is important to provide the gyroscope image sensor with a field of view large enough so as to increase the likelihood that a high contrast feature will be present. One way to increase the field of view of the gyroscope image sensor is to decrease the focal length of the gyroscope objective lens, such as gyroscope objective lens 38 of FIG. 1. However, decreasing the focal length of the gyroscope objective lens will decrease the angular resolution of the gyroscope image sensor.

Figure 6:
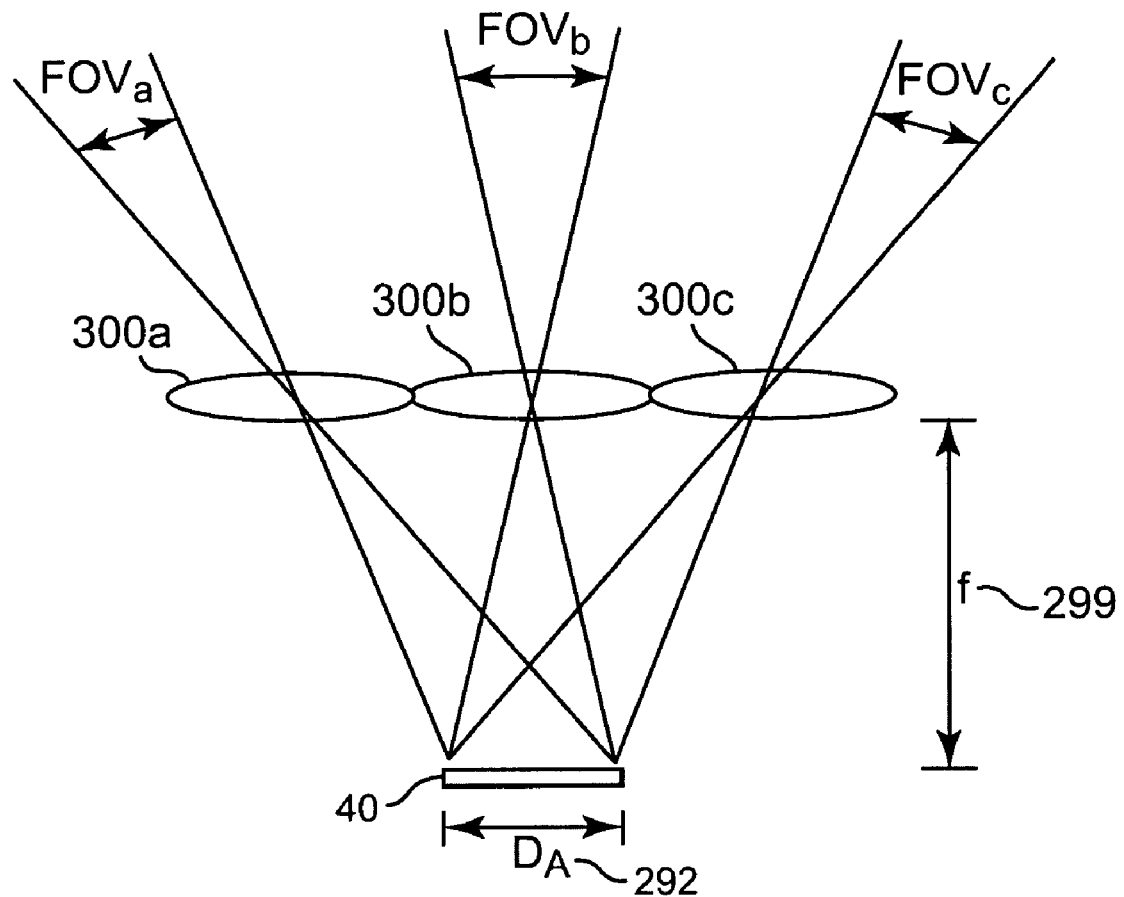
FIG. 6 is a block and schematic diagram illustrating one embodiment of a lens configuration for use with a digital gyroscope according to the present invention.

As illustrated by FIG. 6, one method of increasing the field of view of the gyroscope image sensor, such as gyroscope image sensor 40 of FIG. 1, is to employ an array of gyroscope objective lenses, illustrated as gyroscope objective lenses 300a, 300b and 300c. With reference to FIG. 5, if each of the lenses has a focal length (f) 299 the same as that of gyroscope objective lens 38, the effective field of view of gyroscope image sensor 40 employing the array of lenses 300a, 300b, and 300c is approximately three times the field of view when using only objective lens 38. In the illustrated example, the three lenses 300a, 300b, 300c produce three overlapping images on gyroscope image sensor 40. As such, although the contrast of the gyroscope image sensor 40 will be reduced, the likelihood of detecting a high contrast feature will be increased.

Figure 7:
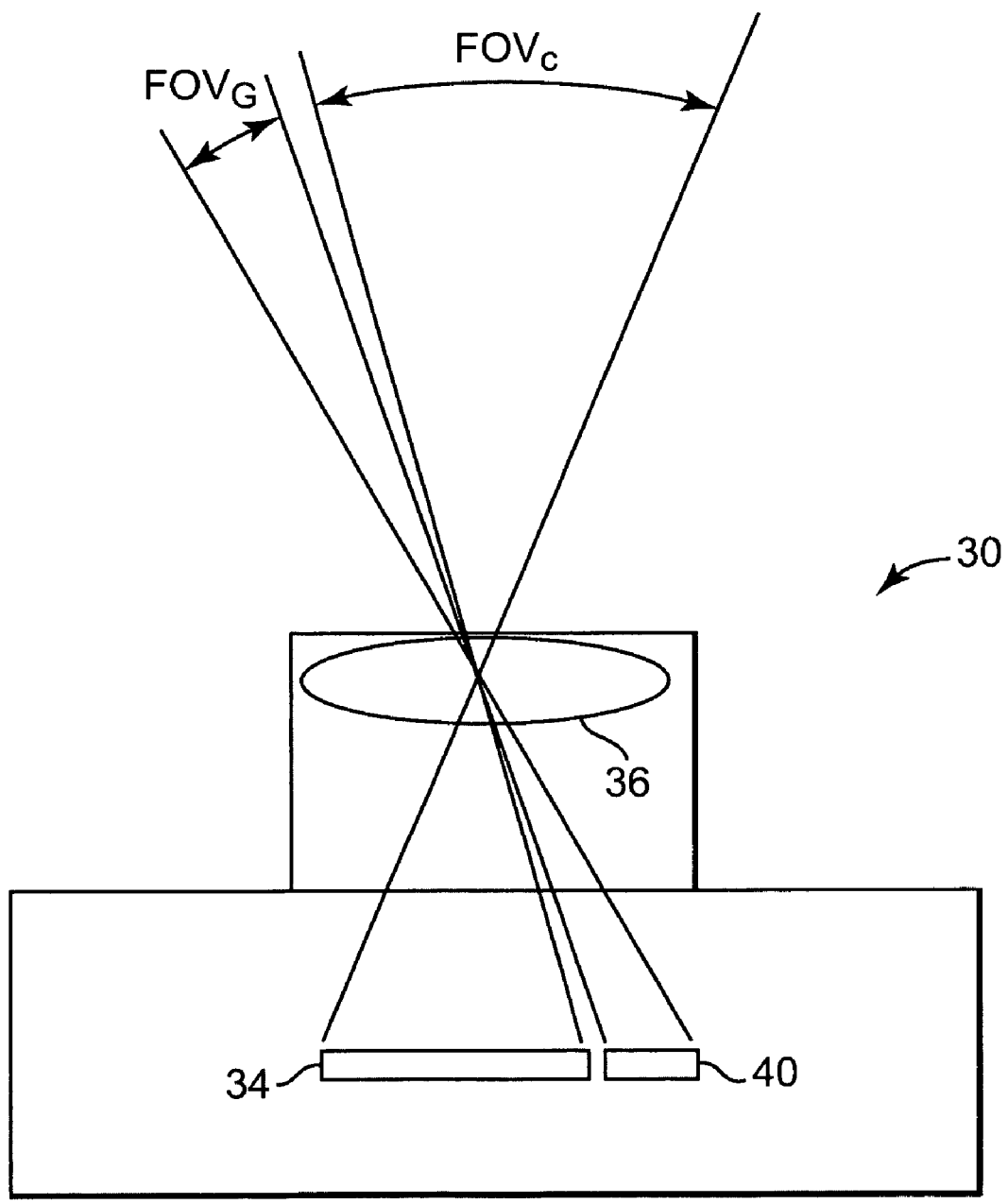
FIG. 7 is a block and schematic diagram illustrating one embodiment of a lens configuration for use with a digital gyroscope according to the present invention.

In one embodiment, as illustrated by FIG. 7, camera objective lens 36 is shared with gyroscope image sensor 40, thereby eliminating the need for an independent gyroscope objective lens, such as gyroscope objective lens 38 illustrated by FIG. 1.

Figure 8:
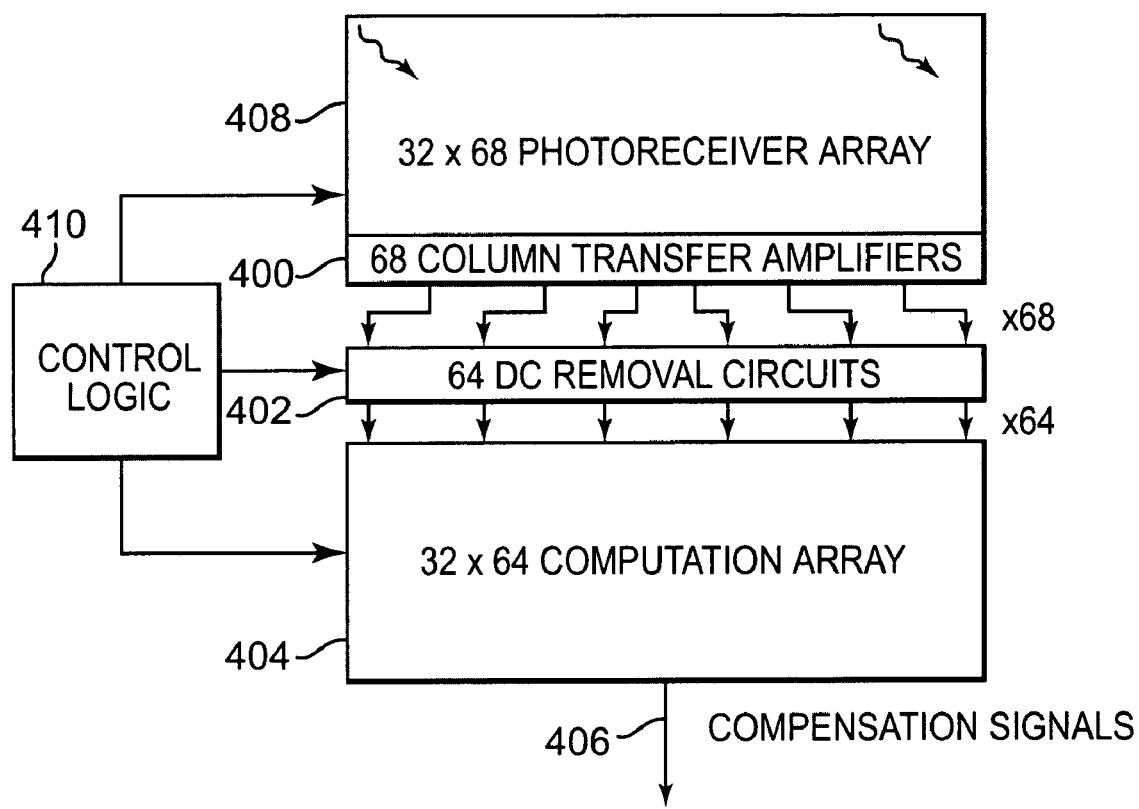
FIG. 8 is a block diagram illustrating one embodiment of a digital gyroscope according to the present invention.

FIG. 8 is a block diagram illustrating one embodiment of a digital gyroscope according to the present invention, such as digital gyroscope 32. In one embodiment, digital gyroscope 32, as illustrated by FIG. 8, is formed in a single integrated circuit chip. The chip is an analog signal processing chip designed to acquire and process two-dimensional images, providing compensation signals to counter motion of an associated imaging device, such as camera 30, detected through correlation of the acquired two-dimensional images.

In the illustrated embodiment of FIG. 8, gyroscope image sensor 40 of digital gyroscope 32 comprises a thirty-two row by sixty-eight column array of photoelements 408. An array of sixty-eight column transfer amplifiers 400 transfers signals in a row-to-row fashion from the gyroscope image sensor 408 to an array of sixty-four DC removal circuits 402. A computational array 404 receives data from the DC removal circuits 402 and performs computations on the data to provide compensation signals at 406 (i.e. first and second compensation signals 58 and 60 of FIG. 1) to an off-chip system which counters the motion of the associated imaging device based on compensation signals 406 (e.g. translation table 170 and VCMs 172, 174 of FIGS. 3A and 3B).

In the absence of cell-by-cell calibration of a conventional integrated light sensor, some variations in sensitivity will occur as a result of limitations of integrated circuit processing technology. Digital gyroscope chip 32 as illustrated by FIG. 8, calculates correlations between a first or reference image and a second image subsequently captured at a different location relative to gyroscope image sensor 408. Any variations in illumination and photoelement sensitivity will degrade the correlation signal. Consequently, the spatial DC removal circuits 402 of FIG. 8 have been configured to maintain the integrity of the correlation signals, while keeping the cost of the system relatively low. Low spatial frequency changes in illumination and photoelement sensitivity which would otherwise corrupt the correlation signal are removed from the navigation image.

An understanding of the operation of the DC removal circuits 402 is not critical to a full understanding of the operation of the computational array 404, and is therefore not described in detail. However, it is useful to understand the basic operation of the column transfer amplifiers 400.

Figure 9:
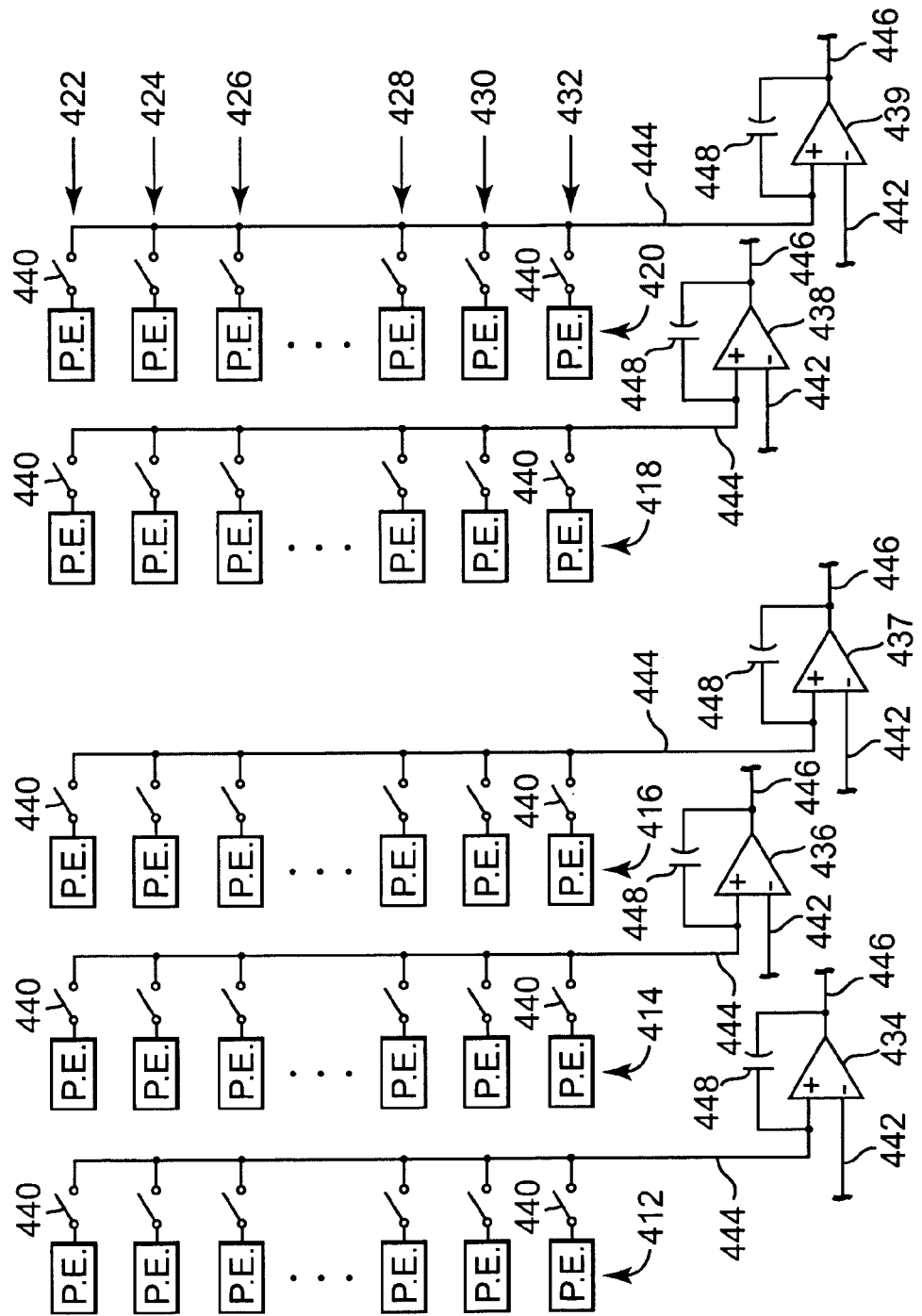
FIG. 9 is a block and schematic illustrating portions of the photoreceiver array and transfer amplifiers of the digital gyroscope of FIG. 8.

Referring to FIG. 9, five columns 412, 414, 416, 418 and 420 of the sixty-eight columns of photoelements are shown. For each of the columns, six of the thirty-two rows 422, 424, 426, 428, 430 and 432 are represented. Each column is operatively associated with a separate transfer amplifier 434, 436, 437, 438 and 439. A photoelement in a column is connected to the operatively associated transfer amplifier by closing a read switch 440. In the operation of the circuitry of FIG. 9, no two photoelements are connected to the same transfer amplifier simultaneously.

Each transfer amplifier 434-439 operates as an integrator and includes an input 442 that is connected to a source of a fixed voltage. A second input 444 is capacitively connected to the output 446 of the transfer amplifier by a transfer capacitor 448.

In the operation of the circuit of FIG. 9, the read switches of the first row 422 of photoelements may be closed, so that each transfer capacitor 448 receives a charge corresponding to the light energy that is received at the associated photoelement in the first row. The received charge is transferred to subsequent processing circuitry via the output lines 446. The readout of a single row is estimated to be between 200 ns and 300 ns. Following the readout of the first row, the read switches of the first row are opened and the transfer amplifiers are reset. The read switches of the second row 424 are then closed in order to transfer the signals from the photoelements of the second row. The process is repeated until each row of photoelements is read.

By the operation of the transfer amplifiers 434-439 of FIG. 9, photoelement signals are transferred in a row-by-row fashion to subsequent circuitry. The DC removal circuits 402 of FIG. 8 continue the parallel processing of photoelement signals, as established by the column transfer amplifiers. The DC removal circuits output sixty-four signals and are representative of light energy received at the navigation sensor 408. In the embodiment of FIG. 8, a frame of signals is comprised of pixel values at the computational array, with the pixel values being acquired by thirty-two transfers of sixty-four signals from the DC removal circuits.

Figure 10:
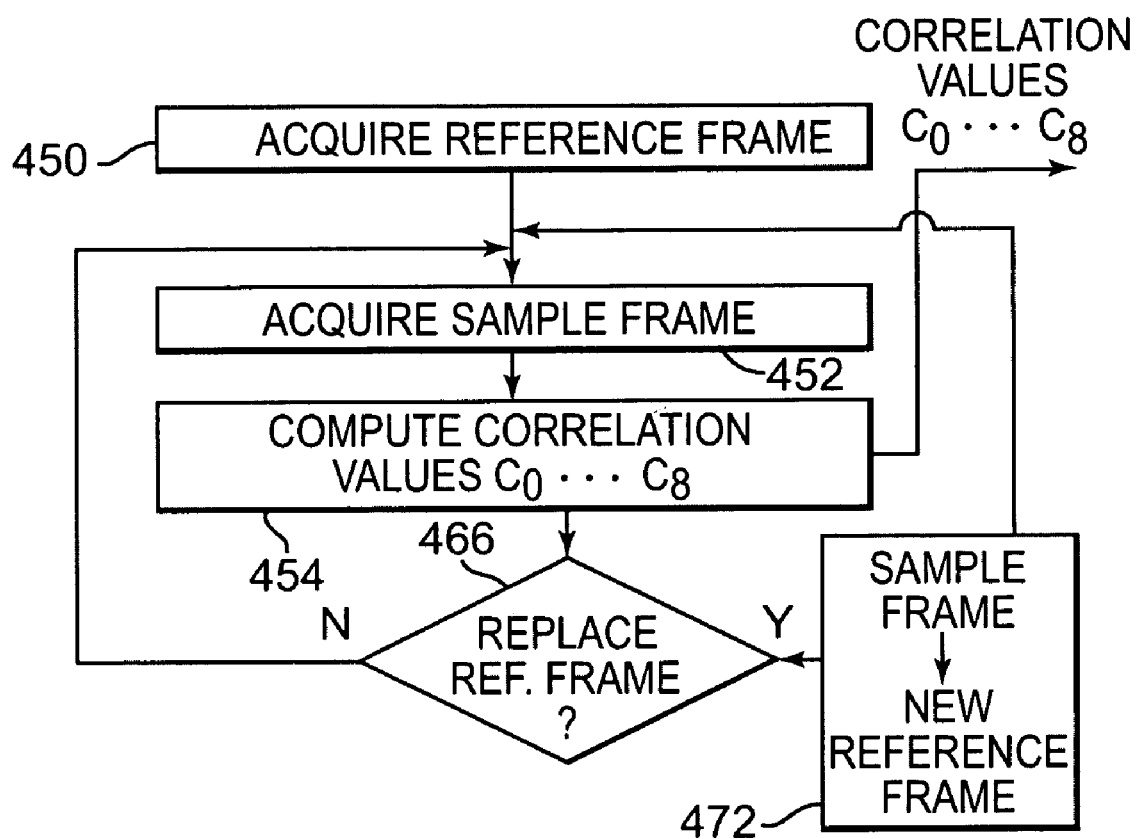
FIG. 10 illustrates one embodiment of a process employed by a digital gyroscope according to the present invention for detecting motion via image correlation.

FIG. 10 illustrates one embodiment of a process employed by a digital gyroscope according to the present invention, such as digital gyroscope 32, for detecting movement of an associated imaging device, such as camera 30 (see FIG. 1). While the invention will be described with reference to processing photoelement signals indicative of features of an environment within a field of view of the digital gyroscope, the method is not restricted to any one application.

The process is performed to correlate a reference frame of features of the environment to subsequent frames of the environment. In effect, the correlations compare the positions of the imaged features which are common to reference frame and the subsequent frames to provide information related to movement of the associated imaging device in the time interval between acquisition of the reference frame and the subsequent frame.

Initially, at 450, a reference frame of signals (i.e. a reference image) is acquired. The reference frame may be considered to be a start position. The position of a navigation sensor relative to an imaged region at a later time may be determined by acquiring 452 a sample frame of signals from the navigation sensor at the later time and then computing correlation values 454 with respect to the reference frame and the later-acquired sample frame.

Acquiring the initial reference frame 450 may take place upon initiation of the imaging process. For example, in one embodiment, as mentioned earlier, the acquisition may be triggered by depressing a shutter control button of the associated imaging device, such as shutter control button 62 of FIG. 2.

While the detection of motion is performed computationally, the concepts of this embodiment may be described with reference to the conceptual view of FIG. 11. A reference frame 456 of 7×7 pixels is shown as having an image of a T-shaped feature 458. At a later time (dt) gyroscope image sensor 408 acquires a second or sample frame 460 which is displaced with respect to frame 456, but which shows substantially the same features. The duration dt is preferably set such that the relative displacement of the T-shaped feature 458 is less than one pixel of the navigation sensor at the velocity of translation of the associated imaging device, such as camera 30.

If the imaging device has moved during the time period between acquiring the reference frame 456 of signals and acquiring the sample frame 460 of signals, the T-shaped feature will be shifted. While the preferred embodiment is one in which dt is less than the time that allows a full-pixel movement, the conceptual representation of FIG. 11 shows that the feature 458 has shifted upwardly and to the right by one full pixel. The full-pixel shift is assumed only to simplify the representation.

Figure 11:
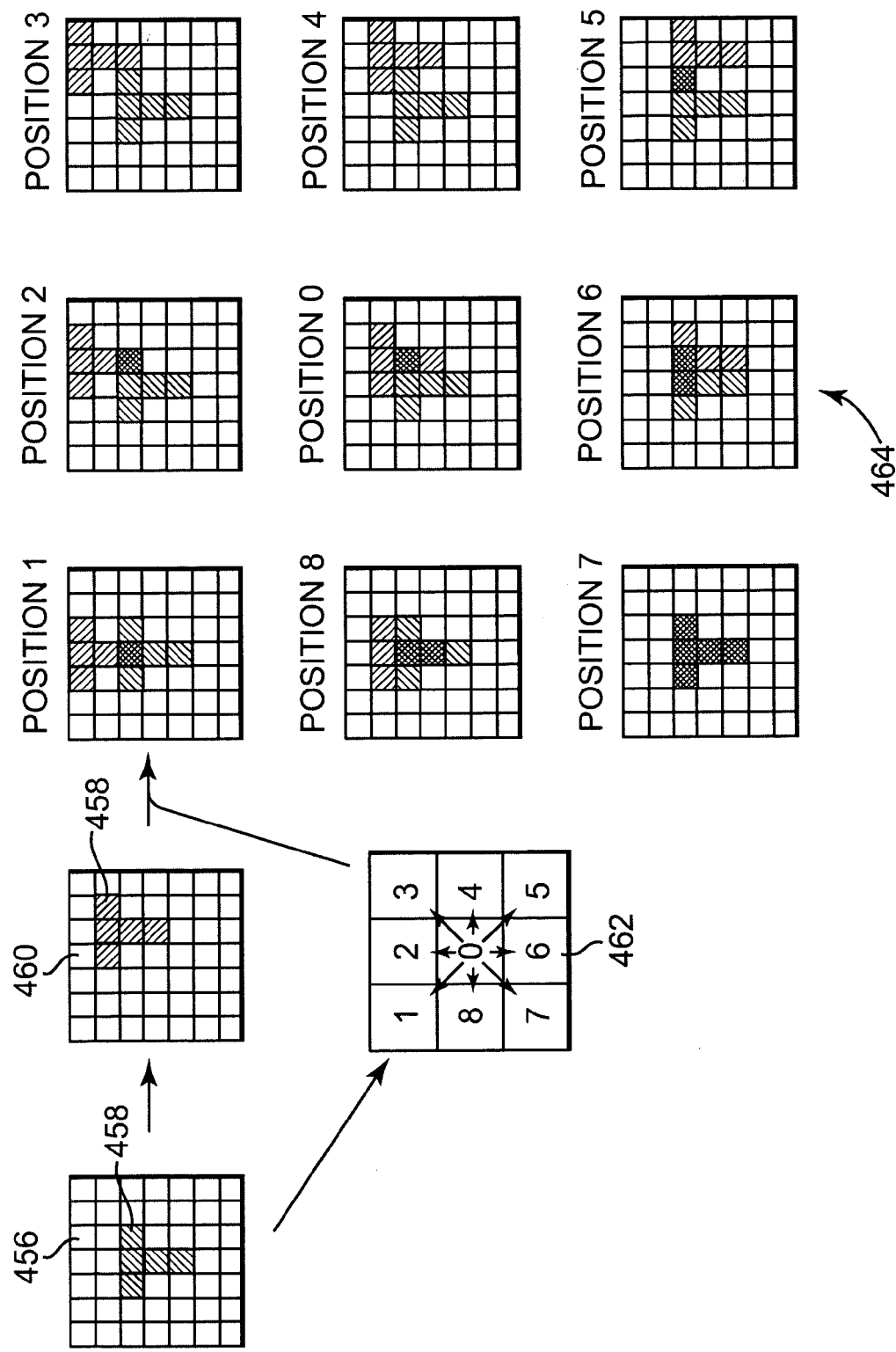
FIG. 11 is a schematic representation of portions of the process of FIG. 10.

Grid 462 in FIG. 11 represents sequential shifts of a pixel value of a particular pixel within the 7×7 array of frame 460.

The sequential shifts are individual offsets into the eight nearest-neighbor pixels. That is, step "0" does not include a shift, step "1" is a diagonal shift upward and to the left, step "2" is an upward shift, etc. The shifts are performed simultaneously for all of the pixels of the sample frame 460. In this manner, the nine pixel-shifted frames can be combined with the reference frame 456 to produce the array 464 of position frames. The position frame designated as "Position 0" does not include a shift, so that the result is merely a combination of frames 456 and 460. "Position 7" has the minimum number of shaded pixels, and therefore is the frame with the highest correlation. Based upon the correlation results, the position of the T-shaped feature 458 in the sample frame 460 is determined to be a diagonal rightward and upward shift relative to the position of the same feature in earlier-acquired reference frame 456, which implies that the imaging device has moved down and to the left during time dt.

While other correlation approaches may be employed, an acceptable approach is a "sum of the squared differences" correlation. For the embodiment of FIG. 13, there are nine correlation coefficients ($C_k = C_0, C_1 \ldots C_8$) formed from the nine offsets at member 462. Another option regards the shifting of the sample frame 460, since the correlation operates equally well by offsetting the reference frame 456 and leaving the sample frame unshifted.

Correlations are used to find the locations of features 458 common to reference frames 456 and sample frame 460 in order to determine the displacements of the features. As described above, such as by FIGS. 3A and 3B for example, the position of the camera image sensor 34 is adjusted so as to counteract the motion detected by the correlation of subsequent sample frames to reference frame 456. While the process provides a high degree of correlation, errors, even though they may be minor, can accumulate over time as each successive sample frame 460 is compared to reference frame 456. If allowed to accumulate over too long a period of time, such errors may lead to poor counteracting of the detected motion and, consequently, to poor stabilization of the image. This is particularly true of the open-loop stabilization system 275 illustrated by FIG. 4.

In light of the above, in one embodiment, if too long a time duration has passed since the initial reference frame 456 was acquired without a photo being taken by camera 30, a new reference frame 456 is acquired. Additionally, in one embodiment, if a user of camera 30 greatly shifts the camera such that there are no common features between sample frame 460 and reference frame 456, a new reference 456 is acquired.

As such, with reference again to FIG. 10, at 466 a determination is made following each computation of the correlation values at 454 as to whether to replace the reference frame prior to subsequent correlation processing. If it is determined that the reference frame is not to be replaced, a determination is made at step 468 as to whether to translate the signals, i.e., the pixel values, of the reference frame. If the determination is made not to replace the reference frame 456, the process returns to 452 to acquire a next sample frame and the process continues. If the determination is made to replace the reference frame, the sample frame 460 in FIG. 11 becomes the new reference frame, as shown at 472 in FIG. 10. A next sample frame is then acquired at 452 and the process continues.

By determining the change in positions of common features between the reference frame and the sample frame, the relative movement between gyroscope image sensor 408 and the environment being imaged is detected. Based on the movement detected by the correlation, digital gyroscope 32 provides compensation signals 406 to control compensation measures to counteract the detected motion so as to maintain a substantially fixed relationship between a scene being imaged and an image plane of an imaging device (e.g. a camera image sensor of a digital camera), and thereby reduce image blur.

Figure 12:
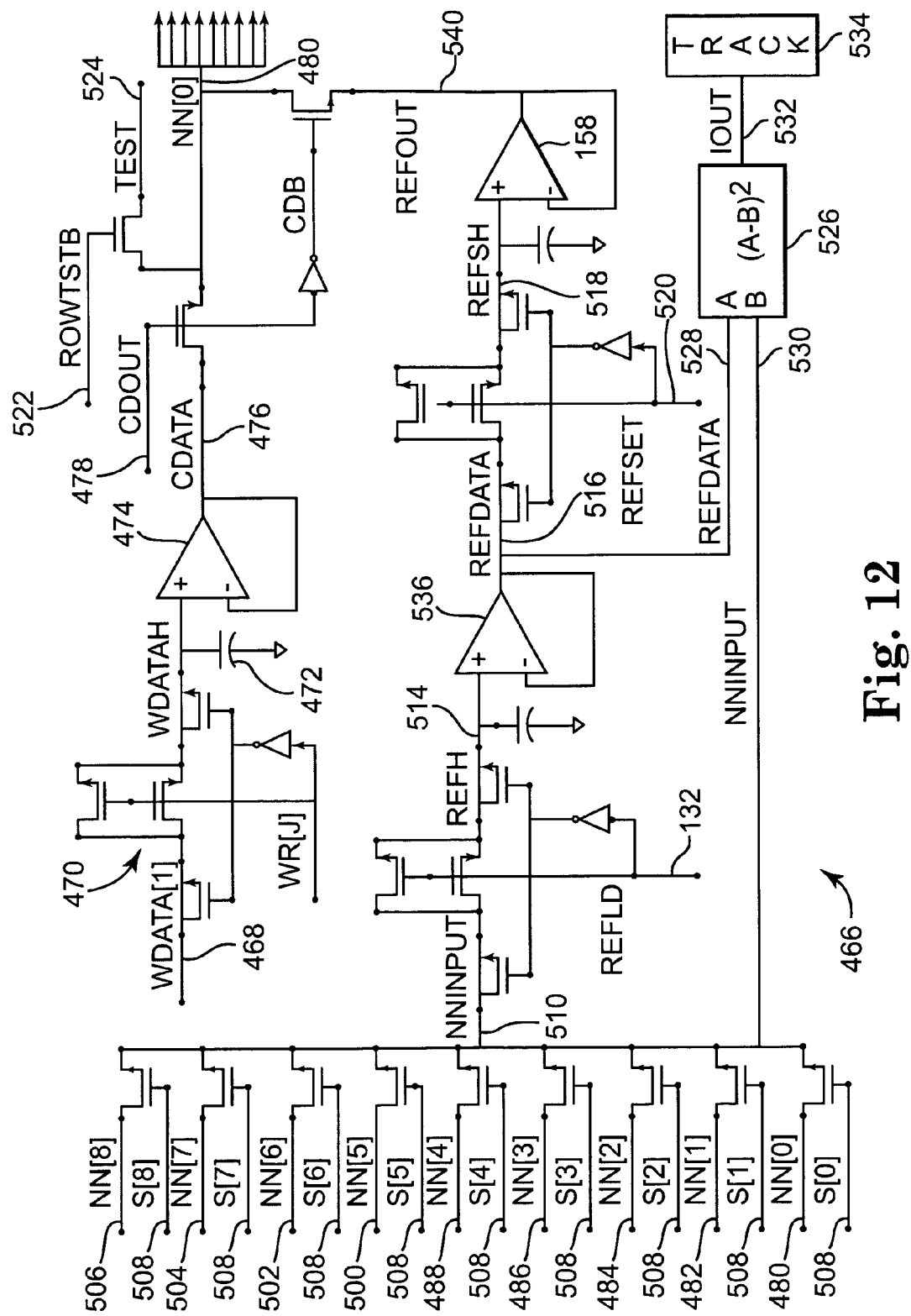
FIG. 12 is a schematic diagram of an individual cell within the computational array 404 of FIG. 8.

FIG. 12 is a schematic diagram of an individual cell within the computational array 404 of FIG. 8. However, as will be understood by persons skilled in the art, other circuits may be used to carry out the process described with reference to FIGS. 10 and 11.

Image data WDATA(i) is representative of light energy from a particular photoelement loaded into the computational cell 466 at line 468, with a charge compensated transistor switch 470 under the control of a WR(j) signal. After the WR(j) signal is deasserted, the new data is held on capacitor 472 and is buffered by an amplifier 474. The computational cell is a data cell within a two-dimensional array of cells. Referring briefly to FIG. 11, the cell may be used to store pixel values and to shift the pixel values for a single pixel in the 7×7 array that comprises frames 456 and 460. The CDATA node 476 of FIG. 12 is one CDATA node within the computational array that permits simultaneous signal processing of all pixels of a frame of signals. Initially, the array of CDATA nodes collectively forms the comparison image, or "reference frame." As will be explained below, the CDATA nodes subsequently form the sample frame. Control input CDOUT 478 selects signal CDATA, comparison data, or selects REFOUT for the nearest-neighbor output node NN(0) 480.

The nearest-neighbor inputs NN(0)-NN(8) 480, 482, 484, 486, 488, 500, 502, 504 and 506 are separately selected by means of switch control signals S(0)-S(8) on lines 508. The NN(0)-NN(8) inputs 480-506 are the outputs of the nearest-neighbor cells according to the pixel map 462 of FIG. 11. Consequently, the node 480 is shown both as an output that fans out for connection to nearest-neighbor cells and as an input for the cell 466. The switch control signals are generated by a 4-9 encoder, not shown, that is external to the computational array. The 4-bit input to the encoder is referred to as the nearest-neighbor address and takes on binary values from 0000(0) to 1000(8).

The nearest-neighbor input (NNINPUT) node 510 is sampled by pulsing REFLD 512, thereby storing the NNINPUT on node REFH 514. Similarly, REFDATA 516 can be sampled and held on REFSH 518 by pulsing REFSFT 520.

For testing, ROWTSTB 522 can be asserted, allowing the NN(0) signal to propagate to the TEST output 524. The TEST signals from each cell in a row of cells connect to common vertical buses in each column of the computational array and are multiplexed at the bottom of the array and driven off-chip. A standard row decoder along the left edge of the array allows selection of a particular row for test. However, the test feature is not critical to the invention.

Each computation cell 466 in the array of cells has a circuit 526 that determines the correlation values identified in FIG. 10 with reference to step 454. A first input 528 receives the reference data from REFDATA node 516. A second input 530 provides the nearest-neighbor input NNINPUT selected by the appropriate switch control signal at lines 508. The output 532 of the correlation cell is a current. All of the correlation outputs in the computational array are summed together in a single off-chip summing resistor of a tracking circuit 534. The voltage developed across the summing resistor is referred to as the correlation values in FIG. 12.

In the embodiment of FIG. 12, the circuit 526 is based on a squared-difference calculation. The cell 466 may be modified to provide product-based correlations without modifying the basic architecture of the array Control inputs S(0)-S(8), REFLD, REFSFT and CDOUT are global to the entire array.

It is important to understand the relationship between the nearest-neighbor map represented by 462 in FIG. 11 for a single cell and for the array as a whole. Location 0 of an image refers to the present location of the image. When referring to the movement of an image from location 0 to location 1, the representation is that the image signals in all of the cells of the array are moved to the neighbor cell that is to the left and upward. That is, the movement is relevant to a single cell in the computational array and is relevant to every cell in the array.

The computational array functionality can be described in terms of image acquisition, reference image load, and correlation computation. Image acquisition refers to the loading of new image signals via the WDATA line 468 of each computation cell 466. In the present implementation, every 40 microseconds a new frame of signals, i.e., pixel values, is acquired from the photoelement array via the column transfer amplifiers and the DC removal amplifiers.

The process of loading a new image is referred to as a "frame transfer." Frame transfer takes approximately 10 microseconds to complete. The frame transfer control circuit asserts a signal FTB, not shown, during frame transfer. The operations of the computation array described below are coordinated with the frame transfer process by observing and synchronizing with the FTB signal. The validity of a new comparison image is signaled by the falling edge of the FTB signal. The operations described below are only appropriate when FTB is not asserted.

Loading a reference frame of pixel values is required before any image correlations can be calculated. To load the reference frame, all of the signals at the CDATA nodes 476 in the computational array must be transferred to the REFH nodes 514. This is accomplished by setting CDOUT 478 and S(0) high, and pulsing the REFLD signal on line 512.

After a reference frame has been loaded, the computational array is ready to compute correlations. Correlations between the reference frame of pixel values and the subsequent sample frame are computed by setting the nearest-neighbor address to the desired value and recording the resulting voltage developed across the summing resistor of the displacement tracking circuit 534. When the photoreceiver array has moved a single pixel distance from the location at which the reference frame was acquired, a strong correlation will be detected at one of the nearest-neighbor locations, since there will be a minimal level of output current. In FIG. 11, the correlation is detected to be at POSITION 7 in the array 464. Sub-pixel movements can be determined by interpolating from multiple current-output readings in two-dimensional correlation space. It should be noted that correlations between the reference frame and itself can be computed by setting CDOUT 478 low and pulsing REFSFT 520. This causes the nearest-neighbor inputs to come from the reference frame, rather than from the sample frame.

It is noted that FIGS. 8 through 12 above describe only one example embodiment of digital gyroscope 32 according to the present invention. Other circuit configurations and processes can be employed by digital gyroscope 32 to acquire and correlate images to detect motion. Additionally, although described herein primarily with respect to still cameras, the teaching of the present invention can be readily adapted for application in camcorders and other imaging apparatuses providing motion pictures. For example, when applied to camcorders, the digital gyroscope can be configured to update the reference frame as the camcorder pans across a selected scene and can be configured to include filtering to discriminate between intentional motion caused by panning of the camcorder or moving objects with the scene and unintentional motion, such as that caused by human muscle tremor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A motion sensor configured to control compensation for movement of an imaging device receiving light representative of a selected scene on an image plane, the motion sensor comprising:
    an array of photoelements configured to acquire successive images of features of an environment within a field of view of the motion sensor; including a first image of features and a second image of features acquired at a time interval after the first image, the first and second images including common features,
    a controller configured to receive and correlate the first and second images to detect movement of the imaging device about a first axis and a second axis during the time interval by detecting differences in locations of the common features relative to the array of photoelements, and to provide first and second compensation signals based on the correlation to control opto-mechanical adjustments to counter detected movement of the imaging device about the first axis and the second axis so as to maintain a substantially fixed relationship between the selected scene and the imaging plane; and
    an objective lens to direct light to the array of photoelements;
    wherein the array of photoelements and the objective lens of the motion sensor are configured to have an angular resolution that substantially matches the angular resolution of a camera image sensor and of a zoom lens of the imaging device when the zoom lens is in a telephoto position at which the zoom lens has its longest focal length.

2. The motion sensor of claim 1, wherein the first image comprises a reference image.

3. The motion sensor of claim 1, wherein a first image of the successive images of features of the environment comprises the reference image and each subsequently acquired image of the successive images is correlated to the reference image to detect movement of the imaging device.

4. The motion sensor of claim 1, wherein the motion sensor comprises an integrated circuit package including the array of photoelements and the controller.

5. The motion sensor of claim 1, wherein the array of photoelements comprises a complimentary metal oxide semiconductor image sensor.

6. An imaging device comprising:
    a stage moveable along a first axis and a second axis;
    an imaging plane positioned on the stage and configured to receive light representative of a selected scene; and
    a motion sensor comprising:
        an array of photoelements positioned on the stage and configured to acquire successive images of features of an environment within a field of view of the motion sensor; including a first image of features and a second image of features acquired at a time interval after the first image, the first and second images including common features, and a controller configured to receive and correlate the first and second images to detect movement of the imaging device about the first axis and the second axis during the time interval by detecting differences in locations of the common features relative to the array of photoelements, and to provide first and second compensation signals based on the correlation to control movement of the stage to counter detected movement of the imaging device about the first axis and the second axis so as to maintain a substantially fixed relationship between the selected scene and the imaging plane;

a camera objective zoom lens associated with the imaging plane and a motion sensor objective lens associated with the motion sensor;

wherein the motion sensor objective lens has a focal length such that an angular resolution of the array of photoelements of the motion sensor substantially matches an angular resolution of an image sensor of the imaging device when the camera objective zoom lens is in a telephoto position at which the camera objective zoom lens has its longest focal length.

7. The imaging device of claim 6, wherein movement of the stage to counter detected movement of the imaging device about the first axis and the second axis maintains a substantially fixed relationship between the environment within the field of view of the motion sensor and the array of photoelements.

8. The imaging device of claim 6, including a first voice coil motor configured to move the stage along the first axis in response to the first compensation signal and a second voice coil motor configured to move the stage along the second axis in response to the second compensation signal.

9. The imaging device of claim 6, a plurality of objective lenses associated with the array of photoelements of the motion sensor, each objective lens of the plurality having a corresponding field of view, with the field of views of each of the plurality of objective lenses combining to form an effective field of view for the array of photoelements.

10. The imaging device of claim 9, wherein each lens of the plurality of objective lenses projects an image of features within the corresponding field of view onto the array of photoelements, wherein each image of features is different from one another.

11. A method of compensating for movement of an imaging device receiving light representative of a selected scene on an image plane, the method comprising:

configuring an image sensor and an objective lens to have an angular resolution that substantially matches the angular resolution of a camera image sensor and zoom lens of the imaging device when the zoom lens has its longest focal length;

acquiring successive images of features of an environment with the image sensor, including a first image of features and a second image of features acquired after at a time interval after the first image, the first and second image including common features;

correlating the first and second images to detect movement of the imaging device about a first axis and a second axis by detecting differences in locations of the common features relative to the image sensor;

controlling opto-mechanical adjustments based on the correlation to counter detected movement of the imaging device so as to maintain a substantially fixed relationship between the selected scene and the imaging plane.

12. The method of claim 11, wherein the first image comprises a reference image and the correlating includes selecting an initial image of the successive images of features of the environment as the reference image.

13. The method of claim 11, comprising updating the reference image with a subsequent image of the successive images of features based on selected operating criteria.

14. The method of claim 13, wherein updating the selected operating criteria comprises movement of the imaging device resulting in no common features between the first and second images.

15. The method of claim 11, wherein controlling opto-mechanical adjustments comprises adjusting a position of the image plane along the first axis and the second axis.

16. The method of claim 15, wherein controlling opto-mechanical adjustments comprises adjusting the position of the image plane together with a position of the image sensor along the first axis and the second axis.

* * * * *